(12) United States Patent
Fukase et al.

(10) Patent No.: US 9,653,969 B2
(45) Date of Patent: May 16, 2017

(54) BRUSH STRUCTURE WITH HEAT DISSIPATION MEMBER

(75) Inventors: Tatsuya Fukase, Chiyoda-ku (JP);
Hitoshi Isoda, Chiyoda-ku (JP);
Naohide Maeda, Chiyoda-ku (JP);
Masahiko Fujita, Chiyoda-ku (JP); Dai Nakajima, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 494 days.

(21) Appl. No.: 14/110,249

(22) PCT Filed: Jul. 28, 2011

(86) PCT No.: PCT/JP2011/067253
§ 371 (c)(1),
(2), (4) Date: Oct. 7, 2013

(87) PCT Pub. No.: WO2013/014783
PCT Pub. Date: Jan. 31, 2013

(65) Prior Publication Data
US 2014/0035431 A1 Feb. 6, 2014

(51) Int. Cl.
*H02K 9/28* (2006.01)
*H01R 39/38* (2006.01)
*H02K 5/14* (2006.01)

(52) U.S. Cl.
CPC ............ *H02K 9/28* (2013.01); *H01R 39/388* (2013.01); *H02K 5/141* (2013.01)

(58) Field of Classification Search
USPC .................. 310/227, 244, 251, 252, 229
See application file for complete search history.

(56) References Cited

U.S. PATENT DOCUMENTS 5,387,832 A * 2/1995 Tanaka et al. ............... 310/249
5,744,889 A * 4/1998 Niimi ..................... H02K 13/00
310/239

(Continued)

FOREIGN PATENT DOCUMENTS

CN 103460568 A 12/2013
JP 63310349 A 12/1988

(Continued)

OTHER PUBLICATIONS

International Search Report issued in PCT/JP2011/067253 dated Sep. 13, 2011.

(Continued)

*Primary Examiner* — Naishadh Desai
(74) *Attorney, Agent, or Firm* — Sughrue Mion, PLLC (57) ABSTRACT

To obtain a rotating electrical machine preventing a functional failure and shortening of the life of brushes caused by a temperature rise of the brushes installed to a vehicle AC power generator or a motor generator. A brush holder holding brushes supplying a field current to a rotor is provided with brush temperature suppressing metal members installed substantially parallel to the brushes in the vicinity of abutment portions of the brushes and slip rings in point-, line-, or surface-contact with the brushes at least at one point besides energization terminals. The brush temperature suppressing metal members not only diffuse heat generated at the brushes, but also function as a heat capacity for a case where a large amount of heat is generated in a short time, such as during regenerative power generation and a start-up operation, and thereby prevent an excessive temperature rise of the brushes.

14 Claims, 8 Drawing Sheets

(56) References Cited

U.S. PATENT DOCUMENTS

| | | | |
|---|---|---|---|
| 5,773,906 A | 6/1998 | Mukai et al. | |
| 5,825,114 A * | 10/1998 | Mukai | 310/251 |
| 5,949,175 A | 9/1999 | Cummins | |
| 6,229,242 B1 | 5/2001 | Autret et al. | |
| 2003/0111929 A1 | 6/2003 | Hong et al. | |
| 2006/0273685 A1 | 12/2006 | Wada et al. | |
| 2007/0001535 A1 | 1/2007 | Mori | |
| 2007/0080603 A1* | 4/2007 | Kawano | 310/248 |
| 2007/0222328 A1 | 9/2007 | Mashino | |
| 2007/0241632 A1* | 10/2007 | Mukai et al. | 310/242 |
| 2009/0189478 A1 | 7/2009 | Wada et al. | |
| 2009/0255186 A1* | 10/2009 | Uchimura | 49/358 |
| 2010/0289351 A1 | 11/2010 | Maeda et al. | |
| 2011/0148366 A1 | 6/2011 | Iwamoto et al. | |
| 2011/0169383 A1* | 7/2011 | De Filippis | 310/68 R |
| 2014/0001915 A1 | 1/2014 | Fukase et al. | |

FOREIGN PATENT DOCUMENTS

| | | |
|---|---|---|
| JP | 9-74721 A | 3/1997 |
| JP | 9-93874 A | 4/1997 |
| JP | 2002-142403 A | 5/2002 |
| JP | 2002240771 A | 8/2002 |
| JP | 2003-047207 A | 2/2003 |
| JP | 2006-325388 A | 11/2006 |
| JP | 2007215276 A | 8/2007 |
| JP | 2007274770 A | 10/2007 |
| JP | 2008-236979 A | 10/2008 |
| JP | 2009-177993 A | 8/2009 |
| JP | 2011130639 A | 6/2011 |

OTHER PUBLICATIONS

Communication dated Mar. 17, 2015 from the Japanese Patent Office in counterpart application No. 2013-525514.
Japanese Office Action (Reasons) issued May 27, 2014 in Patent Application No. 2013-525514.
Communication dated Aug. 3, 2015 from the State Intellectual Property Office of the People's Republic of China issued in Chinese application No. 201180071677.9.
Communication, dated May 23, 2016, from the European Patent Office in counterpart European application No. 11869984.2.

* cited by examiner

BRUSH STRUCTURE WITH HEAT DISSIPATION MEMBER

CROSS REFERENCE TO RELATED APPLICATIONS

This is a National Stage of International Application No. PCT/JP2011/067253 filed Jul. 28, 2011, the contents of all of which are incorporated herein by reference in their entirety.

TECHNICAL FIELD

The present invention relates to a rotating electrical machine, and more particularly, to a structure of a rotating electrical machine having a brush holder configured to prevent a temperature rise.

BACKGROUND ART

For example, in a wound-field rotating electrical machine for vehicle in the related art, a field current is supplied from a brush to a field winding of a rotor via a slip ring. In this instance, the brush slides over the slip ring while the brush is pressed against the slip ring by a spring attached behind the brush. The brush and the slip ring generate heat due to an electrical loss and sliding friction in a sliding portion and an electrical loss in an energizing path of each. A set of the slip ring and the brush is installed on each of a plus side and a minus side. These brushes and slip rings are generally covered and held in a brush holder made of insulating resin or the like to ensure electrical isolation between the plus side and the minus side.

A labyrinthine structure is provided between the brush holder storing the brushes therein and mold resin of the slip rings. The labyrinthine structure prevents entry of foreign matter and moisture from the outside and is also furnished with a brush abrasion powder discharging function. A slight clearance is provided to the labyrinthine structure. However, only a small proportion of cooling air generated by a cooling fan provided to the rotor is supplied to an abutment portion of the slip ring and the brush. Because of these factors, the slip ring and the brush become hot chiefly in the abutment portion. When the brush becomes hot, a wear rate becomes higher, which raises a problem that the life of the brush becomes shorter.

In a rotating electrical machine like a motor generator that performs not only power generation during the driving but also regenerative power generation and a start-up operation, a current exceeding 10 amperes (A) is passed through the brushes for a period of less than a second to about tens of seconds in some cases. In such a case, a large amount of heat is generated at the brushes and the temperature rises abruptly. As a result, the brush holder holding the brushes becomes hotter than its melting temperature and may possibly cause a failure.

In order to eliminate this problem, there is a structure by which heat generated at the brushes is released to the outside by heat transfer using radiation fins attached to an outer portion of the brush holder (for example, PTL 1). Alternatively, there is proposed a structure in which the brushes are held by a brush holder made of metal and plates that supply a field current to the brushes integrally molded with a brush holder base holding the brush holder are connected to a bracket via a sealing material, so that heat generated at the brushes is released to the bracket (for example, PTL 2). Further, there is proposed a structure in which ventilation openings are provided to the brush holder to cool the brushes and to discharge brush abrasion powder, so that the temperature of the brushes is lowered and hence the life of the brushes is extended (for example, PTL 3).

CITATION LIST

Patent Literature

PTL 1: JP-A-2003-047207
PTL 2: JP-A-2008-236979
PTL 3: JP-A-2009-177993

SUMMARY OF INVENTION

Technical Problem

According to the structure disclosed in PTL 1, the radiation fins that can be installed to the outer surface of the brush holder are limited to a small number and a small size by the surface area of the brush holder. Also, when this structure is applied to a rotating electrical machine for vehicle power generation having a structure by which the interior is cooled with cooling air generated by rotations of the rotor, it is difficult to supply sufficient cooling air to the radiation fins installed to the outer portion of the brush holder when the rotation speed is low. Further, of various types of rotating electrical machine for vehicle power generation, a motor generator requires a high radiation capability because a field current larger than the one in a general vehicle power generator is passed through. For the reasons described above, this structure has a problem that a necessary and sufficient brush cooling capability cannot be obtained.

The structure disclosed in PTL 2 is effective in a case where the interior of the bracket in which to install the brush holder is hermetically closed as with an electric power steering described therein and no problem occurs regarding an electrical malfunction caused by foreign matter from the outside. However, in a rotating electrical machine for vehicle power generation or a motor generator, this structure allows foreign matter to readily enter inside from the outside on the periphery of the brush holder. Hence, this structure has a problem that a metal member having potential as high as that of the brushes cannot be exposed to the outside of brush holder forming resin.

Further, the structure disclosed in PTL 3 is provided with brush cooling ventilation openings in the brush holder and the brush holder naturally increases in size. Also, because a size of the ventilation openings that can be provided is substantially determined by the size of the brush holder, it is difficult to secure a large cross section for the ventilation openings. Hence, this structure has a problem that a brush cooling capability is limited.

Also, for an in-vehicle AC rotating electrical machine, such as a motor generator performing regenerative power generation and a start-up operation besides power generation during the driving, it is necessary to form the brush holder holding the brushes from an electrically insulating material. Accordingly, the structures disclosed in PTLs 1 to 3 cannot achieve a temperature lowering effect against a large amount of heat generation in a short time.

The invention was devised to solve the problems in the related art discussed above and provides a rotating electrical machine having a longer life of brushes and capable of preventing a malfunction caused by a temperature rise of the brushes by efficiently releasing heat generated in the vicinity of abutment portions of the brushes and slip rings to the outside of a brush holder and by preventing an excessive temperature rise of the brushes by increasing a heat capacity for a case where a large amount of heat is generated in a short time in the vicinity of the brushes.

Solution to Problems

The invention includes: a rotation shaft supported in a rotatable manner on a housing having a front bracket and a rear bracket; a stator fixed to the housing and having an armature winding; a rotor fixed to the rotation shaft and having a field core and a field winding; slip rings fixed to the rotation shaft and supplying a field current to the field winding; a positive brush and a negative brush supplying the field current to the field winding via the slip rings; and a brush holder made of insulating material and holding the both brushes in storage portions in a mutually electrically isolated state. The brush holder includes brush temperature suppressing metal members which are installed in the brush storage portions and come into contact with the brushes.

Advantageous Effects of Invention

According to the invention, in a case where a large amount of heat is generated in a short time in an abutment portion of the brush and the slip ring, because the brush holder is provided with the brush temperature suppressing metal member installed so as to be in contact with the brush, it becomes possible to suppress a temperature rise of the brush by increasing a heat capacity in the vicinity of the brush. By diffusing heat generated at the brush using the temperature suppressing metal member, radiation properties can be enhanced even in a case where a brush holder having the same thermal conductivity is used. It thus becomes possible to provide a highly reliable rotating electrical machine by preventing a functional failure caused by melting of the brush holder due to an excessive temperature rise of the brush and by preventing the life from becoming shorter due to an increasing wear rate of the brush.

BRIEF DESCRIPTION OF DRAWINGS

FIG. 3 shows a brush holder in the rotating electrical machine of the first embodiment.

FIG. 4 shows a a brush holder in a rotating electrical machine according to a second embodiment of the invention.

DESCRIPTION OF EMBODIMENTS

First Embodiment

Figure 1:
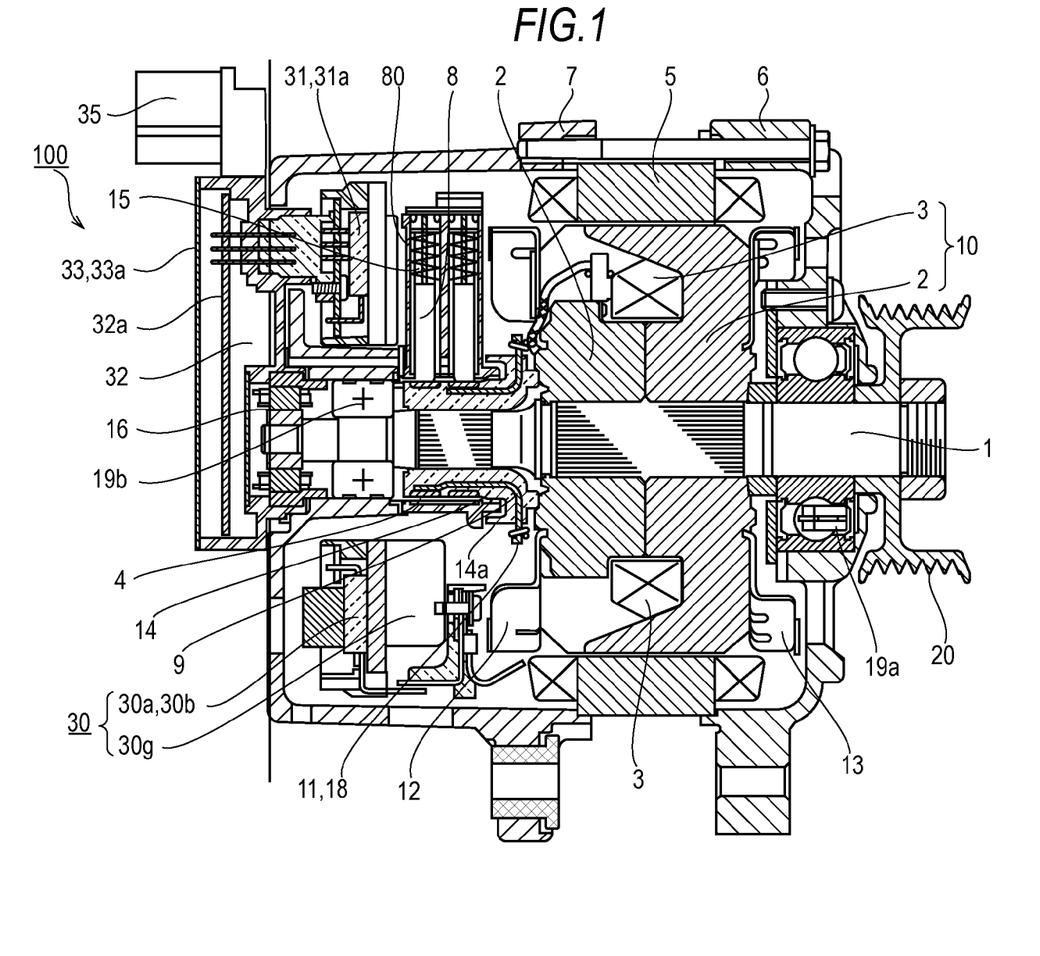
FIG. 1 is a cross section of a rotating electrical machine according to a first embodiment of the invention.
Figure 2:
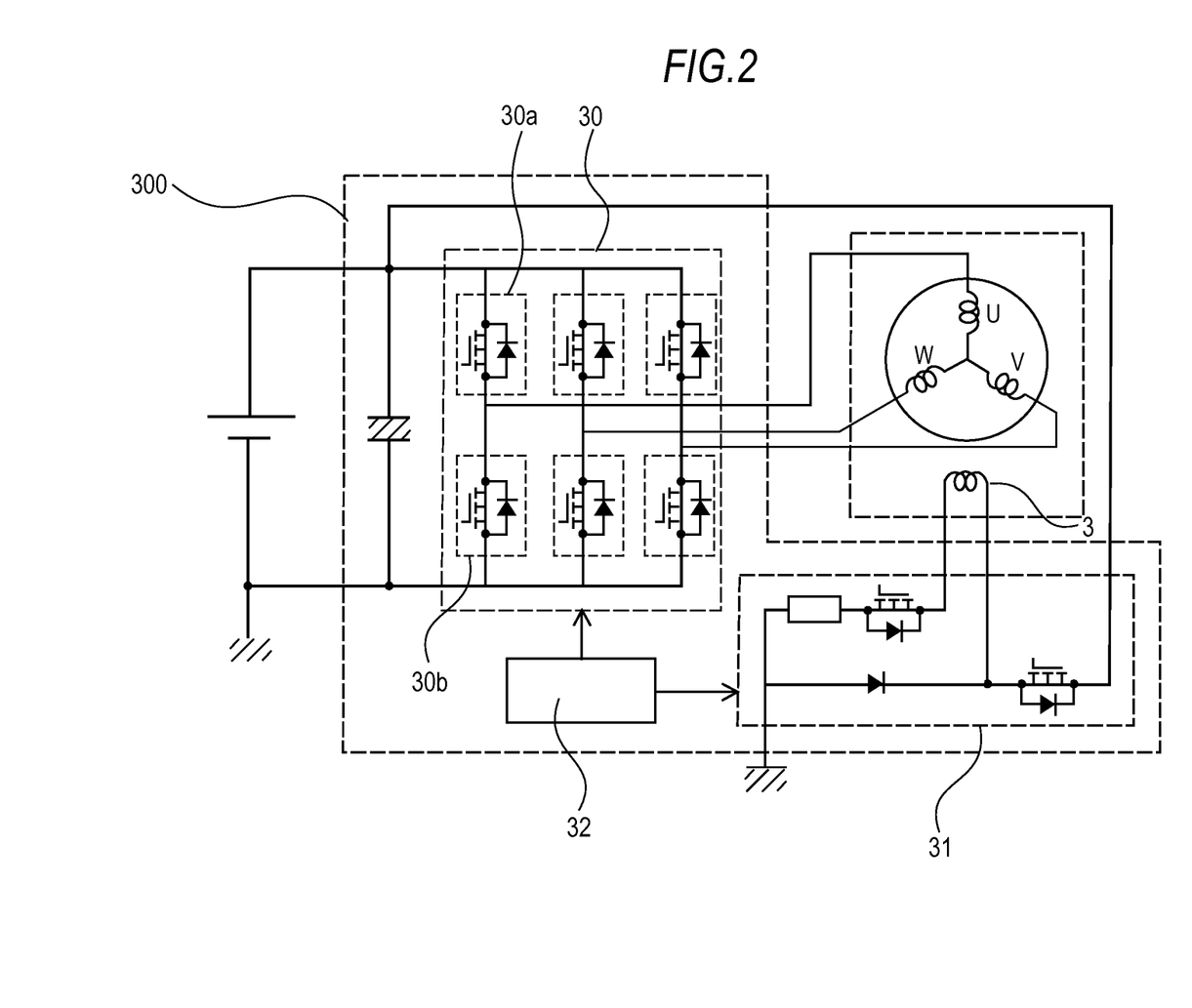
FIG. 2 is a circuit diagram of the rotating electrical machine of the first embodiment.

Hereinafter, a first embodiment of the invention will be described according to the drawings. FIG. 1 is a cross section of a rotating electrical machine of the first embodiment and FIG. 2 is a circuit diagram thereof. The rotating electrical machine described in the first embodiment is an AC power generation motor for vehicle (motor generator). It should be appreciated, however, that the invention is also applicable to an AC power generator for vehicle.

Referring to FIG. 1 and FIG. 2, a rotating electrical machine 100 includes a front bracket 6 and a rear bracket 7 as a housing, a rotation shaft 1 supported in a rotatable manner via a bearing 19a of the front bracket 6 and a bearing 19b of the rear bracket 7, a stator 5 fixed to the front bracket 6 and the rear bracket 7 and having an armature winding, a rotor 10 fixed to the rotation shaft 1 and having a field core 2 and a field winding 3, and a pulley 20 firmly fixed to the rotation shaft 1 at an end on the front side. The rotating electrical machine 100 is coupled to a rotation shaft (not shown) of an engine via a belt (not shown) pulled over the pulley 20. Because the rotor 10 and the stator 5 become hot due to heat generated during the driving of the rotating electrical machine 100, cooling fans 12 and 13 are provided to the rotor 10 on both end faces in an axial direction. A rotation sensor 16 is provided at an end of the rotation shaft 1.

The rotating electrical machine 100 also includes a pair of slip rings 4 attached on a rear side of the rotation shaft 1, a brush holder 80 attached to the rear bracket 7 so as to position on the rear outer periphery of the rotation shaft 1, and a pair of positive and negative brushes 8 installed inside the brush holder 80 so as to come into sliding contact with a pair of the slip rings 4 and pushed by a spring 15. A current from the slip ring 4 is supplied to the field winding 3 by a lead wire 18 wound around a lead wire wound portion 11.

The rotating electrical machine 100 further includes a power circuit portion 30 that converts DC power to AC power or AC power to DC power, a field circuit portion 31 that supplies a field current to the field winding 3 of the rotor 10, and a control circuit portion 32 that controls the power circuit portion 30 and the field circuit portion 31. The rotating electrical machine 100 is connected to the outside via an outside connection connector 35 and a power-supply terminal (not shown).

The power circuit portion 30 includes a plurality of power elements 30a and 30b and a heat sink 30g serving also as an electrode member electrically connected to the power elements 30a and 30b. The power elements 30a and 30b are interconnected by a conducting member (not shown) insert-molded in resin and the heat sink 30g, and are electrically connected to the control circuit portion 32 by a relay wiring member (not shown).

The control circuit portion 32 shown in FIG. 1 includes a control circuit board 32a and a resin case 33 in which to store the control circuit board 32a. The case 33 has a waterproof structure that prevents entry of brine, muddy water into the control circuit board 32a using a waterproof cover 33a or the like. The field circuit portion 31 can be mounted on a board on which the control circuit board 32a is mounted or formed separately from the control circuit board 32*a*. As is shown in the circuit diagram of FIG. 2, a power assembly (ASSY) 300 is formed of the power circuit portion 30, the field circuit portion 31, and the control circuit portion 32. The outside connection connector 35 is provided in the vicinity of the control circuit portion 32 and electrically connected to the control circuit portion 32.

Figure 3A:
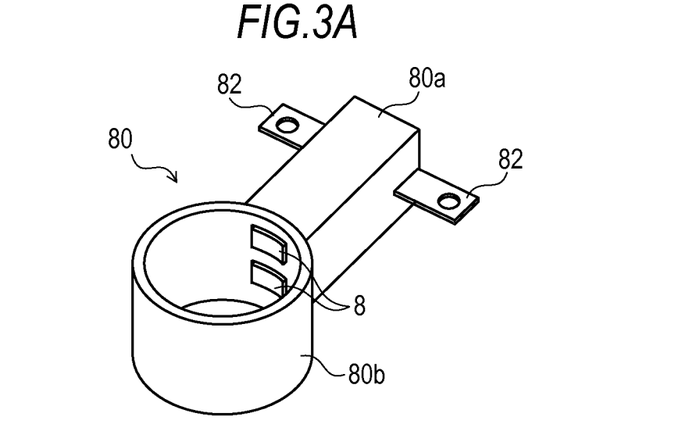
FIG. 3A is a perspective view of the outward appearance.
Figure 3B:
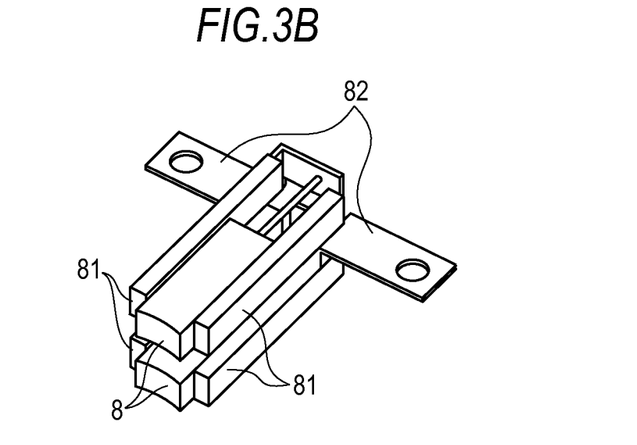
FIG. 3B is a perspective view showing locations of brushes and brush temperature suppressing metal members in the brush holder.
Figure 3C:
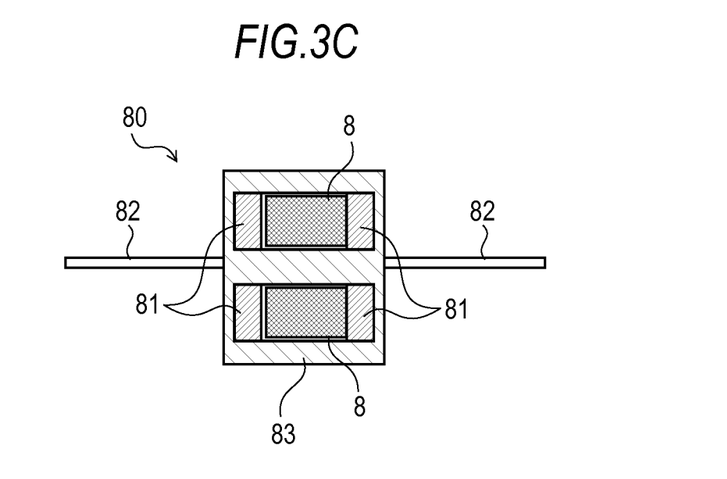
FIG. 3C is a cross section of the brush holder.

The brush holder 80 of this embodiment will now be described in detail. FIG. 3 shows the brush holder 80. FIG. 3A is a perspective view of the outward appearance, FIG. 3B is a perspective view showing the interior, and FIG. 3C is a cross section. The brush holder 80 includes a rectangular tube portion 80*a* in which to store the brushes and an annular portion 80*b* installed so as to surround the slip rings 4, and the former and the latter are formed integrally from brush holder forming resin 83. The interior of the rectangular tube portion 80*a* is divided to two chambers serving as brush storage portions and a positive brush is stored in one chamber and a negative brush is stored in the other chamber (hereinafter, the positive and negative brushes are referred to simply as the brushes 8 when discrimination between the positive and negative brushes is not necessary). Energization terminals 82 individually connected to the positive brush and the negative brush are provided so as to protrude from the both sides of the rectangular tube portion 80*a*. Two openings are provided to the annular portion 80*b* and tip ends of the brushes 8 are pushed out from the openings so as to come in contact with the slip rings 4.

As is shown in FIG. 3C, the brushes 8 are stored in the brush storage portions of the rectangular tube portion 80*a* in a movable manner. Brush temperature suppressing metal members 81 coming into contact with the brushes 8 while allowing the brushes 8 to move are inserted in the brush holder forming resin 83 of the rectangular tube portion 80*a* on the both sides of the respective chambers in which the brushes 8 are stored. The internal structure of the brush holder 80 omitting the brush holder forming resin 83 is shown in FIG. 3B. In this embodiment, the brush temperature suppressing metal members 81 are provided so as to sandwich the brushes 8, that is, two brush temperature suppressing metal members 81 are provided on the both sides of the respective positive and negative brushes.

In the field-wound rotating electrical machine 100 shown in FIG. 1, a field current from the field circuit portion 31 is supplied via the brushes 8 held in the brush holder 80 fixed to the rear bracket 7 and the slip rings 4 attached to the rotation shaft 1. Because the fixed brush 8 and the rotating slip ring 4 come into contact with each other, friction between the brush 8 and the slip ring 4 gives rise to heat generation in a sliding portion of the brush 8 and the slip ring 4. Also, because the brush 8 and the slip ring 4 are held in a contact state in the sliding portion, electric resistance in the contact portion also gives rise to heat generation. Further, Joule heating accompanying energization occurs at the same time in the respective members. Further, between the brush holder 80 and the slip ring 4, there is only a clearance of a labyrinthine structure 14*a* formed of a slip ring mold portion 14 so as to prevent entry of foreign matter or moisture from the outside. Hence, inlet cooling air is limited and so is a radiation effect.

For the reasons described above, there is a problem that a temperature of the brush rises and the life of the brush is shortened. Also, in a rotating electrical machine performing regenerative power generation and an engine start-up operation like a motor generator, a current higher than the one during a power generation operation flows in a short time. In such a case, the temperature of the brush rises noticeably in a short time because a heat capacity of the brush itself is small and a member having a large heat capacity and instantaneously absorbing heat generated at the brush is absent in the vicinity of the brush. It is therefore concerned that the phenomenon as above causes the brush holder forming resin to be softened or melt and a functional failure occurs in a case where the rotating electrical machine 100 is operating in a severe surrounding atmosphere.

A vehicle AC power generator or a motor generator has a structure in which the interior is cooled by cooling air generated by rotations of the rotor provided with fans. Accordingly, a large number of ventilation openings are provided to the brackets 6 and 7. The ventilation openings, however, make it easy for foreign matter to enter from the outside to the vicinity of the brush holder 80. In order to prevent the occurrence of a short circuit between the members caused by foreign matter, the abutment portion of the slip ring 4 and the brush 8 is closed hermetically except for a slight clearance of the labyrinthine structure 14*a* formed of the brush holder 80 and the slip ring mold portion 14 to discharge brush abrasion powder and to make the entry of foreign matter difficult. Hence, no effective radiation path is present in the brushes 8 per se or in the vicinity of the abutment portions of the brushes 8 and the slip rings 4. The absence of a radiation path raises a problem that the brushes 8 become hot. In addition, there is a problem that a temperature of the brushes 8 rises excessively during regenerative power generation or an engine start-up operation accompanying a large amount of heat generation in a short time for the same reason.

To overcome these problems, a heat capacity around the brushes 8 is increased in the invention by providing the brush holder 80 with the brush temperature suppressing metal members 81 apart from the energization terminals 82 as has been described above so as to suppress a temperature rise at the brushes 8 due to an operation accompanying a large amount of heat generation in a short time. In addition, the brush temperature suppressing metal members 81 are installed so as to be in contact with the brushes 8 during continuous power generation as well. Hence, heat is diffused in the vicinity of the heat generation portions and heat is released efficiently to the outside.

The brushes 8 stored in the brush holder 80 generate heat differently depending on operations of the rotating electrical machine 100, that is, a continuous power generation mode, a start-up mode, and a regenerative mode (due to differences of an amount of current, an energization time, and a rotation speed of the rotating electrical machine).

In the continuous power generation mode, a current of about a few amperes (A) is applied for a long time. Hence, a maximum temperature of the brushes 8 reached during an operation is determined by whether the brush holder 80 is cooled satisfactorily or poorly. In this instance, because the brush temperature suppressing metal members 81 are provided to the brush holder 80, heat generated in the vicinity of the heat generation portions at the brush tip ends is diffused by the brush temperature suppressing metal members 81 installed in closest proximity. A radiation path beyond this point has a larger conduction area for diffused heat and a heat resistance from the heat generation portions to the outside atmosphere becomes smaller. This means that the brush cooling effect of the brush holder 80 is enhanced and the maximum temperature of the brushes 8 reached during an operation drops.

On the other hand, in the start-up mode and the regenerative power generation mode, a current as high as about 10 amperes (A) to 20 amperes (A) is passed for a few seconds to tens of seconds. The heat generation portions of the brushes 8 are chiefly Joule heating by electrical resistance of the brush main bodies, heat generation caused by contact resistance in the abutment portions of the brushes 8 and the slip rings 4, and frictional heat by the abutment portions of the brushes 8 and the slip rings 4. Ratios among the respective types of heat vary with a rotation speed. In general, a total of Joule heating caused by electrical resistance of the brush main bodies and frictional heat in the abutment portions of the brushes 8 and the slip rings 4 accounts for about 15% of the total heat generation and heat generation caused by contact resistance in the abutment portions of the brushes 8 and the slip rings 4 accounts for about 85%. In this state, heat of about 15 watts (W) or more is generated in a short time in the abutment portions of the brushes 8 and the slip rings 4.

In this instance, a large temperature distribution is developed with the abutment portions of the brushes 8 and the slip rings 4 at the top. When viewed in broad perspective, this is a state in which a temperature rises only in the vicinity of the tip ends of the brushes. In a state in which heat is generated only in a short time, heat is not transferred from a portion in which a temperature in the vicinity of the brushes rises abruptly to the outside where heat is released. Hence, even when radiation properties of the brush holder 80 are enhanced, an appreciable effect of suppressing a temperature of the brushes 8 cannot be obtained. On the contrary, a temperature lowering effect is exerted on an excessive temperature rise in a short time by increasing a heat capacity in the vicinity of the brush heat generation portions. A temperature rise of the brushes 8 in these modes takes place in too short a time for the temperature to saturate.

A factor that determines the maximum brush reaching temperature in a predetermined energization time is an inclination of a temperature rise with respect to a time. When a heat capacity (specific heat×density×weight) in the vicinity of the brush heat generation portions is increased by installing the brush temperature suppressing metal members 81 so as to be in contact with the brushes 8 as in the invention, a larger amount of heat becomes necessary for a temperature in the vicinity of the brushes to rise. As a result, an inclination of a temperature rise in a short time becomes smaller and a brush reaching temperature in a predetermined time drops. In this instance, it is preferable that the brush temperature suppressing metal members 81 newly installed in the brush holder 80 apart from the energization terminals 82 are made of copper-based metal having a high heat conductivity and securing a relatively high heat capacity.

In addition, the brush holder 80 is installed with the brush temperature suppressing metal members 81 which are different from the energization terminals 82, and the brush temperature suppressing metal members 81 are insert-molded in the brush holder forming resin 83. By insert-molding the brush temperature suppressing metal members 81 inside the brush holder 80, attachment costs can be saved in comparison with a case where the brush temperature suppressing metal members are installed as new components. The brush holder 80 is originally furnished with a function of preventing foreign matter, such as moisture, from entering from the outside to the brushes 8. Because the brush temperature suppressing metal members 81 are insert-molded in the brush holder 80, the brush temperature suppressing metal members 81 and the brush holder forming resin 83 are attached more firmly to each other and make it difficult for foreign matter from entering from the outside in comparison with a case where the brush temperature suppressing metal members 81 are retrofit to or press-fit in the brush holder 80.

As is shown in FIG. 3C, the brush temperature suppressing metal members 81 are installed in the brush holder forming resin 83 so as to surround at least one (herein, two) of the side surfaces of the brushes 8. An effect of reducing a temperature rise of the brushes can be greater as the number of surfaces opposing the brushes 8 increases. In a case where the number of the brush temperature suppressing metal members 81 that can be installed in the brush holder 80 is limited, it is preferable to install the brush temperature suppressing metal members 81 in such a manner that the contact portions of the brushes 8 and the brush temperature suppressing metal members 81 are formed as close to the brush heat generation portions as possible.

Fine clearances are provided between the brush holder 80 and the brushes 8 so that the brushes 8 are allowed to move in a longitudinal direction of the brushes 8 while the rotating electrical machine is in operation. Hence, a force pressing the brushes 8 in a tangential direction to rotations of the slip rings 4 is exerted while the rotating electrical machine is in operation, and surfaces against which the brushes 8 are pressed are generated. In this case, the contact portions of the brushes 8 and the brush temperature suppressing metal members 81 are formed in the vicinity of the heat generation portions of the brushes 8. Hence, this configuration is advantageous in reducing a temperature rise of the brushes 8. In view of the foregoing, in a case where the number of the brush temperature suppressing metal members 81 that can be installed is limited, it is preferable to install the brush temperature suppressing metal members 81 on a side against which the brushes 8 are pressed, that is, onto a surface in a rotational direction of the rotor 10.

In a case where enhancement of moldability and lower costs are strongly required, it is effective to install the brush temperature suppressing metal members 81 to only one of the surfaces of the brush holder 80 against which the brushes 8 are pressed. By installing the brush temperature suppressing metal members 81 to only one surface, not only can moldability be enhanced during insert-molding, but also die manufacturing costs can be saved by making a die as simple as possible. Further, when the die is made simple, maintenance and repair of the die can be easier and less expensive. As a result, it becomes possible to prevent an increase in cost due to an increase of material costs and an increase in weight while maintaining a temperature suppressing effect on the brushes 8.

The contact portions of the brush temperature suppressing metal members 81 and the brushes 8 are formed at least at one point and provided in an electrically connected state. Because the brush temperature suppressing metal members 81 and the brushes 8 are in direct contact with each other, heat generated at the brushes 8 is transferred to the brush temperature suppressing metal members 81 in a short time. In comparison with continuous power generation, such as regenerative power generation and a start-up operation performed by the motor generator, when a high current is passed through the brushes 8 in a short time, a temperature rise of the brushes 8 becomes more moderate with an increase in heat capacity in a range within which heat resistance from the brushes 8 is small. Because the brush temperature suppressing metal members 81 are in direct contact with the brushes 8, it becomes possible to reduce a temperature rise of the brushes during regenerative power generation and a start-up operation. Also, because there is an effect of diffusing generated heat into the brush temperature suppressing metal members 81, a heat transfer area to the outside of the brush holder is increased. Hence, even in a case where the brushes 8 and the brush temperature suppressing metal members 81 are surrounded by a poor heat conducting member like the brush holder forming resin 83, heat radiation can be expected. Further, the brush temperature suppressing metal members 81 are installed inside the brush holder as if to form a framework. Hence, mechanical strength of the entire brush holder is enhanced and it becomes possible to prevent the brush holder from breaking when a load or an impact is applied from the outside.

The brush temperature suppressing metal members 81 may be installed to either one of the positive brush and the negative brush. One set of brushes includes a positive brush and a negative brush and each of these brushes 8 generates heat while the rotating electric machine is in operation. Monitoring temperatures of the brushes 8 reveals that in some cases the two brushes 8 have a temperature difference caused by an electrical or structural problem. A temperature difference can be lessened by installing the brush temperature suppressing metal members 81 to the brush holder 80 on the side of the brush the temperature of which is to be lowered. As a result, it becomes possible to extend the life of the brushes in the rotating electrical machine that is otherwise limited by the life of the brush having the higher temperature and wearing faster. In a case where a balance of weight is poor due to a shape of the brush holder 80 and the position of the brushes 8 in the brush holder 80 or the location of the energization terminals 82 in the brush holder 80, the weight can be better balanced by installing the brush temperature suppressing metal members 81 so as to make a correction on the poor balance.

Second Embodiment

Figure 4A:
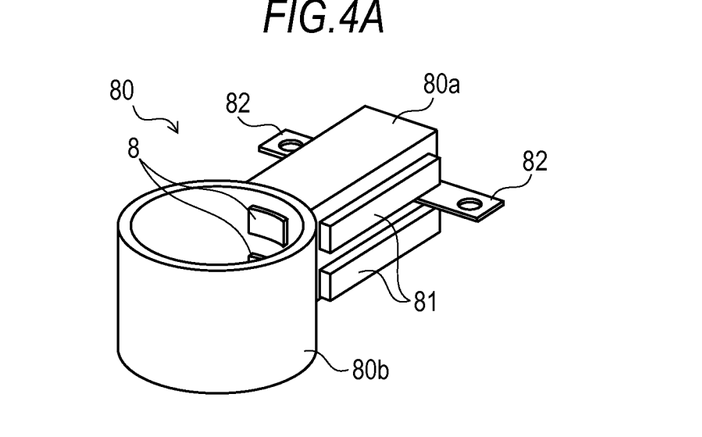
FIG. 4A is a perspective view of the outward appearance.
Figure 4B:
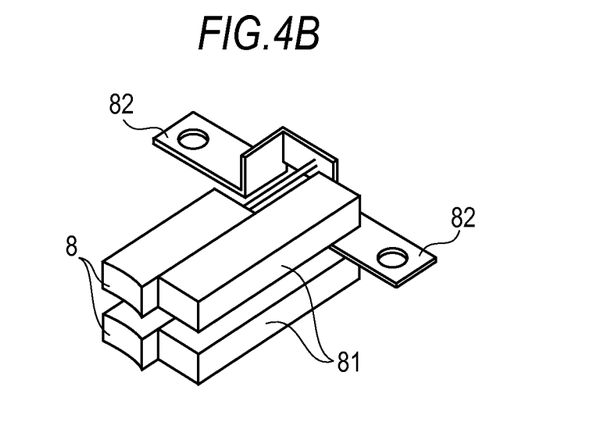
FIG. 4B is a perspective view showing locations of brushes and brush temperature suppressing metal members in the brush holder.
Figure 4C:
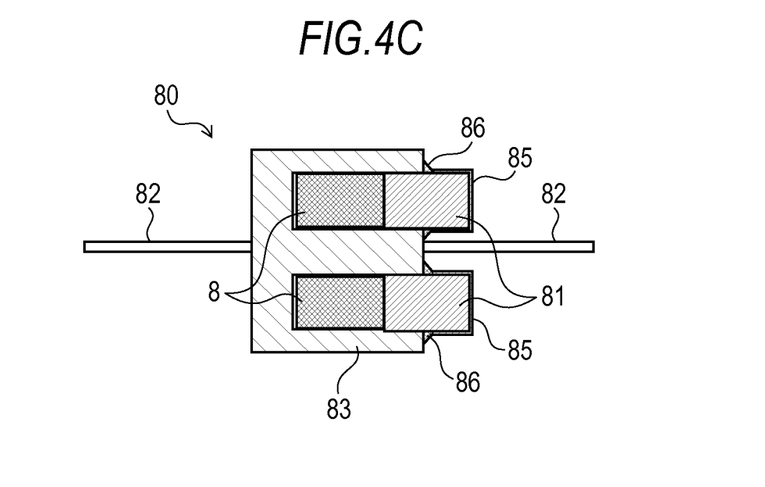
FIG. 4C is a cross section of the brush holder.

A second embodiment will now be described. FIG. 4 shows a brush holder in a rotating electrical machine of the second embodiment. FIG. 4A is a perspective view of the outward appearance of the brush holder. FIG. 4B is a perspective view showing locations of the brushes and brush temperature suppressing metal members in the brush holder. FIG. 4C is a cross section.

A major difference of the brush holder of the second embodiment and the brush holder of the first embodiment above is that a part of the brush temperature suppressing metal member 81 protrudes to the outside of the rectangular tube portion 80a of the brush holder 80. As is shown in FIG. 4C, the brush temperature suppressing metal member 81 includes an insulating layer 85 electrically isolated from foreign matter from the outside on a surface of the protruding portion protruding from the brush holder 80. Also, a sealing 86 made of rubber or resin is provided to the boundary between the brush temperature suppressing metal member 81 and the brush holder forming resin 83. The insulating layer 85 may be formed by coating the brush temperature suppressing metal members 81 with an insulating material by means of paint, application, plating, thermal spray, or lamination. Alternatively, a metal plate having an insulating coating film may be used as the brush temperature suppressing metal members 81.

Referring to FIG. 4, the brush temperature suppressing metal members 81 are provided to only one side of the brushes 8. It should be appreciated, however, that the brush temperature suppressing metal members 81 are not necessarily provided to one side and can be provided to the both sides. In such a case, the brush temperature suppressing metal members 81 on the both sides may have different lengths.

Also, the brush temperature suppressing metal members 81 are provided so as to protrude from the brush holder forming resin 83 herein. It should be noted, however, a radiation effect can be achieved when the brush temperature suppressing metal members 81 are exposed instead of being protruded.

A heat capacity of the brush temperature suppressing metal members 81 can be increased when the brush temperature suppressing metal members 81 are formed to be exposed or protrude to the outside of the brush holder 80. Also, by having the brush temperature suppressing metal members 81 be exposed to the outside where cooling air is flowing, it becomes possible to obtain a cooling effect by radiation from the surface of the brush temperature suppressing metal members.

FIG. 4C is a cross section of the brush holder of the second embodiment and shows a case where the brush temperature suppressing metal members 81 protrude therefrom. Hence, a description will be given on the assumption that an exposed portion is a protruding portion. The surface of the protruding portion of the brush temperature suppressing metal member 81 protruding from the brush holder 80 includes the insulating layer 85 electrically isolated from foreign matter from the outside. For example, a metal plate having an insulating coating film may be used as the brush temperature suppressing metal members 81. Alternatively, the brush temperature suppressing metal members 81 may be coated with an insulating material by means of paint, application, plating, thermal spray, or lamination.

Owing to the configuration as above, even in a case where foreign matter from the outside adheres to the protruding portion of the brush temperature suppressing metal member 81 protruding from the brush holder 80 or the brush temperature suppressing metal members 81 are installed in contact with another member in a vehicle AC power generator or a motor generator, neither leakage of a field current nor a short circuit occurs. The insulating layer 85 coating the brush temperature suppressing metal member 81 can be formed before or after the brush temperature suppressing metal member 81 is insert-molded in the brush holder 80. In a case where the insulting layer 85 is formed before the brush temperature suppressing metal member 81 is insert-molded in the brush holder 80, the insulating layer forming process can be applied to processing in circumstances where the brush holder forming resin 83 cannot withstand, such as in a high-temperature process. In a case where the insulating layer 85 is formed after the brush temperature suppressing metal member 81 is insert-molded in the brush holder 80, the insulating layer forming costs can be saved by adopting a process by which all of the brush temperature suppressing metal members 81 are coated collectively.

The insulating layer 85 may be formed to the brush temperature suppressing metal member 81 in a portion wrapped inside the brush holder. In such a case, by forming an insulating material adhering satisfactorily to the brush holder forming resin 83, a clearance in the interface between the brush holder forming resin 83 and the brush temperature suppressing metal members 81 can be lessened. Alternatively, after the brush temperature suppressing metal members 81 are insert-molded in the brush holder 80, the brush holder may be coated entirely with an insulating material by means of paint. Then, the insulating processing can be simpler and the processing costs can be saved. Also, because the interface between the brush holder forming resin 83 and the brush temperature suppressing metal members 81 or the energization terminals 82 can be filled with the insulating material, it becomes possible to prevent the entry of foreign matter, such as moisture, from the outside.

The interface between the protruding portions of the brush temperature suppressing metal members 81 and the brush holder forming resin 83 may be sealed with the sealing 86 made of rubber or resin. The brush temperature suppressing metal members 81 are insert-molded in the brush holder forming resin 83. When temperature cycles are added to the brush holder 80, a clearance is developed in the interface between the brush temperature suppressing metal members 81, more specifically, the protruding portions of the brush temperature suppressing metal members 81 protruding from the brush holder 80 and the brush holder forming resin 83 because of a difference of linear expansion coefficients between the brush temperature suppressing metal members 81 and the brush holder forming resin 83. It is therefore concerned that the clearance makes it impossible to prevent the entry of foreign matter from the outside atmosphere. To eliminate this concern, by providing the sealing 86 using an elastic member, such as a rubber material or a resin material, so as to cover the interface, it becomes possible to prevent a clearance from developing by absorbing displacement occurring between the brush holder 80 and the brush temperature suppressing metal members 81.

Third Embodiment

Figure 5:
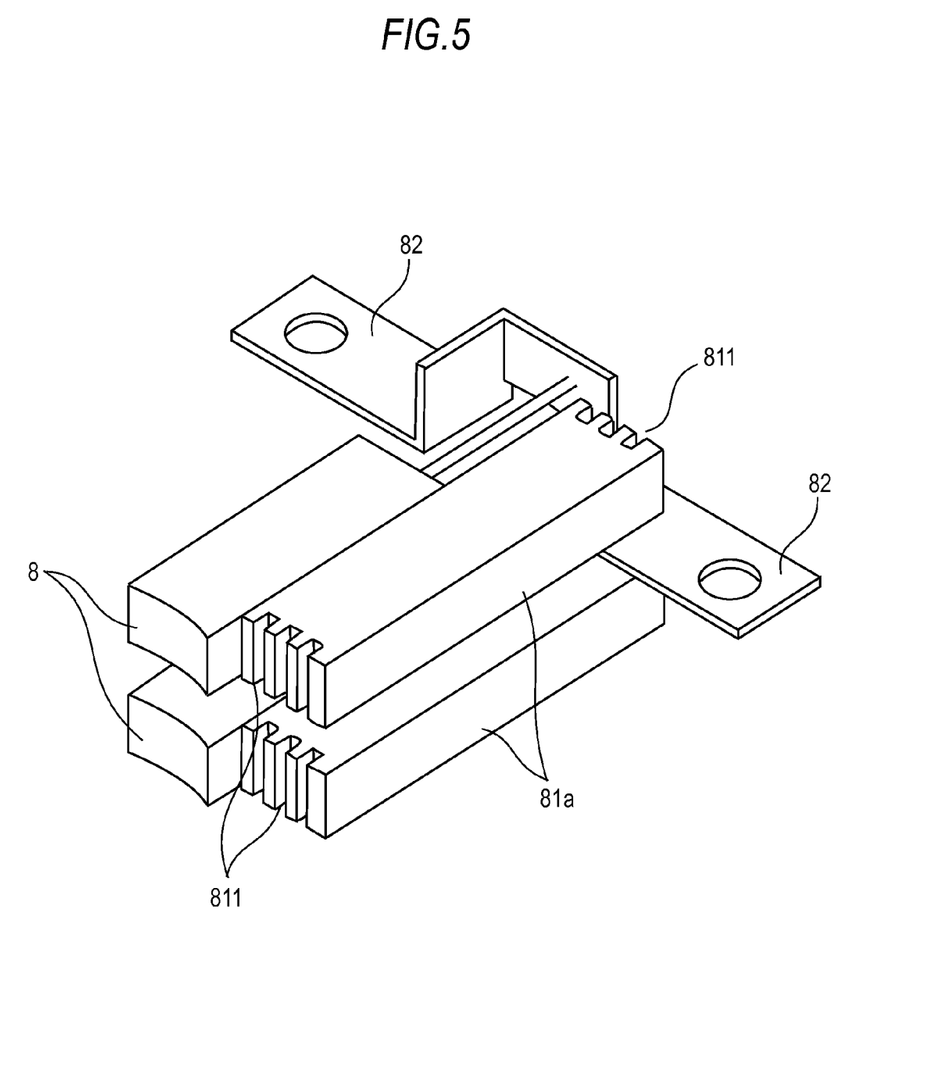
FIG. 5 is a perspective view of the outward appearance showing locations of brushes and brush temperature suppressing metal members in a brush holder in a rotating electrical machine of a third embodiment.

FIG. 5 is a perspective view showing locations of brushes and brush temperature suppressing metal members installed to a brush holder in a rotating electrical machine of a third embodiment. A difference from the second embodiment above is that a brush temperature suppressing metal member 81a of the third embodiment is provided with projections and depressions 811 on side surfaces, that is, on an end face on a side where the brushes 8 are in contact with the slip rings 4 and an end face on the opposite side. The rest of the configuration is the same as that of the second embodiment above. The projections and depressions 811 are formed parallel to a plane along which the brushes 8 and the brush temperature suppressing metal members 81a come in contact with each other.

The brush temperature suppressing metal members 81a have a concavo-convex shape on the side surfaces. Hence, even in a case where foreign matter, such as dust and moisture, enters inside from the interface between the protruding portions of the brush temperature suppressing metal members 81a and the brush holder forming resin 83, the foreign matter cannot move to a deeper portion because the foreign matter is trapped by the respective surfaces of the projections and depressions 811. In addition, because the projections and depressions 811 are formed, even in a case where a force is applied to the brush holder 80 from the outside, there is an effect that the brush temperature suppressing metal members 81a can be prevented from falling off the brush holder forming resin 83 of the brush holder 80.

The projections and depressions 811 may be provided not only to the side surfaces of the brush temperature suppressing metal members 81a but also to surfaces other than the surfaces to which the projections and depressions are provided as shown in FIG. 5. FIG. 5 shows a shape formed by means of press punching or the like. It should be appreciated, however, that an effect can be obtained when the projections and depressions 811 are formed by bending, such as sheet-metal processing.

Fourth Embodiment

Figure 6:
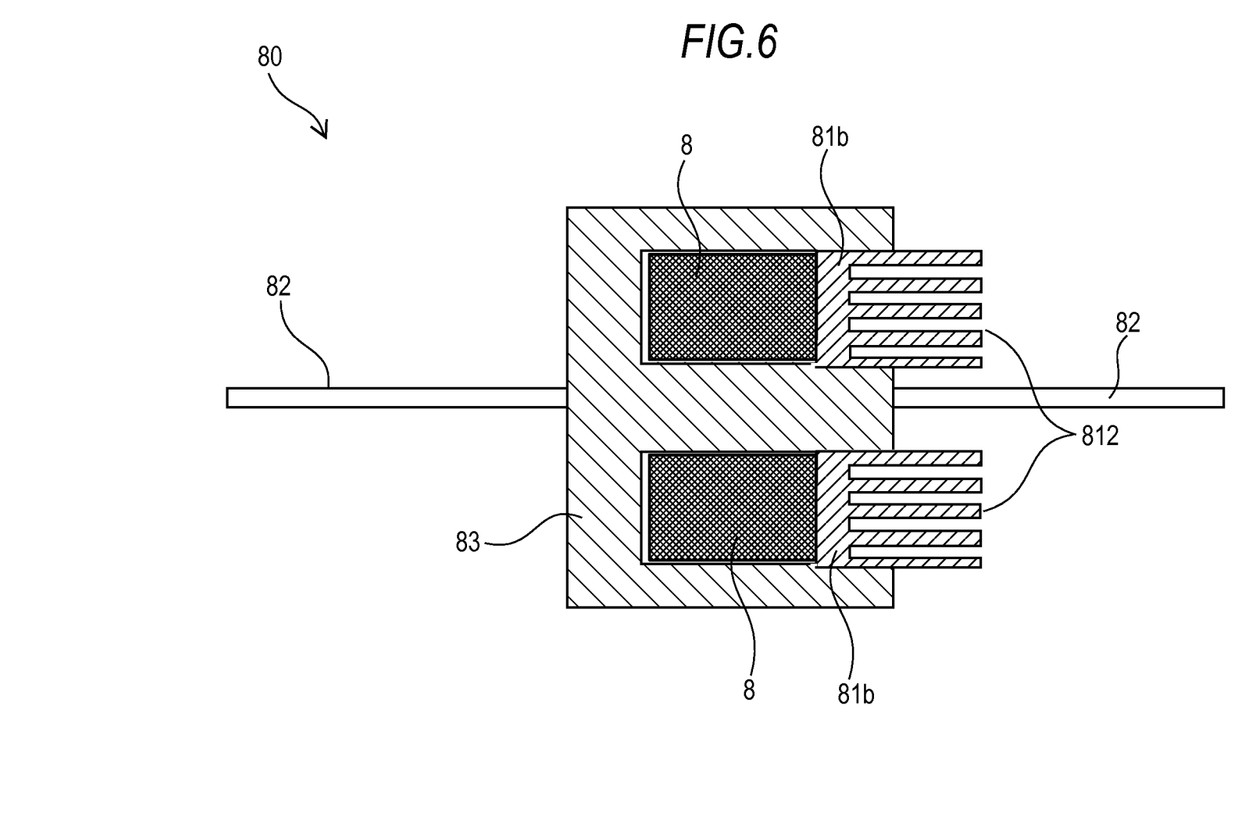
FIG. 6 is a perspective view of the outward appearance showing locations of brushes and brush temperature suppressing metal members in a brush holder in a rotating electrical machine of a fourth embodiment.

FIG. 6 is a cross section showing a brush holder in a rotating electrical machine of a fourth embodiment. A difference between the fourth embodiment and the second embodiment above is that a protruding portion of a brush temperature suppressing metal member 81b protruding from the brush holder 80 includes fins 812, which is an area expanding structure to secure a larger area coming into contact with cooling air. FIG. 6 shows a shape of extruding fins. It should be appreciated, however, that pin fins or plate fins can be used instead. By providing the protruding portion of the brush temperature suppressing metal member 81b protruding from the brush holder 80 with an area expanding structure of a fin shape, radiation to cooling air takes place efficiently. Hence, a temperature suppressing effect can be enhanced. In addition, this shape is particularly effective in a case where the rotating electrical machine rotates at a high speed and a large amount of cooling air is generated by rotations of the rotor.

Fifth Embodiment

Figure 7:
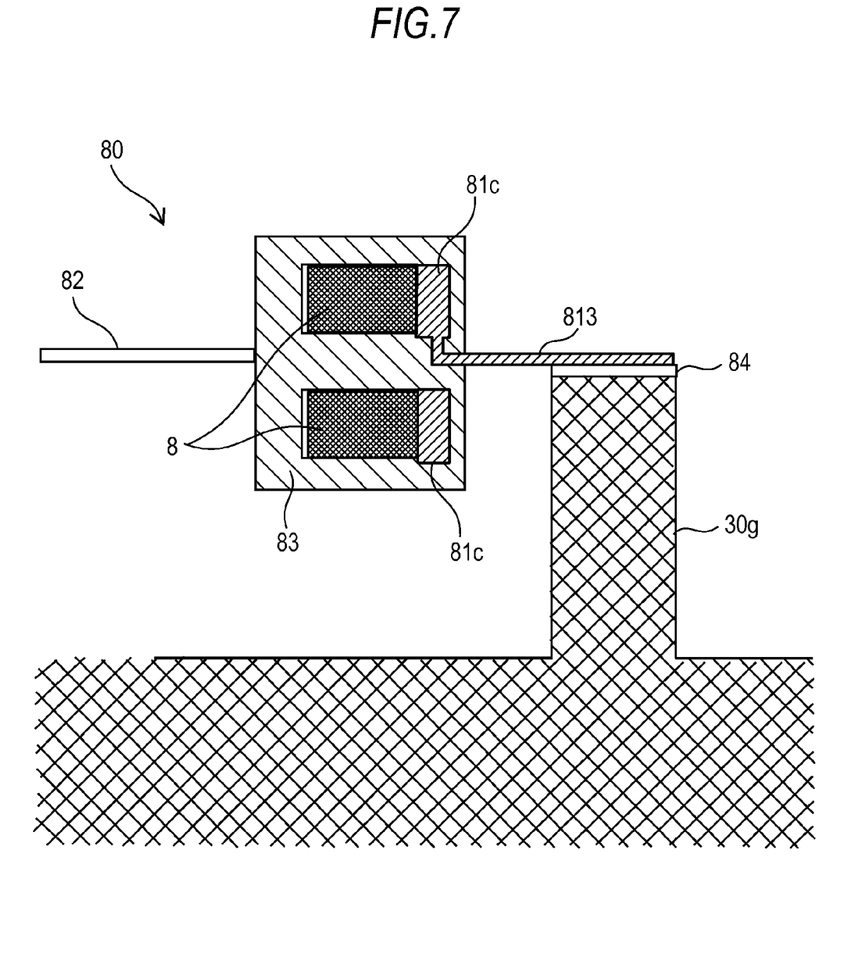
FIG. 7 is a cross section showing a brush holder in a rotating electrical machine of a fifth embodiment.

FIG. 7 is a cross section of a brush holder 80 in a rotating electrical machine of a fifth embodiment. The brush holder 80 has a structure as follows. That is, a plate-like portion 813 of a brush temperature suppressing metal member 81c protrudes from the brush holder 80, and a part of the plate-like portion 813 is connected to a heat sink 30g via a high-radiation clearance filling agent 84, which is an insulating member, so that heat generated at the brush is released to the heat sink 17.

Accordingly, a member having low heat conductivity and to be electrically isolated can be installed at a position far from the heat generation portion. Hence, diffusion of heat in the radiation path is promoted and a temperature lowering effect is therefore enhanced. Also, when a bonding function is also furnished to the high-radiation clearance filling agent 84, electrical isolation and a brush holder fixing effect can be achieved by single processing. Besides the existing brush holder fixing structure, by adding fixation of the brush temperature suppressing metal members 81c, brush holder fixing strength is increased. As a result, the brush holder 80 is fixed at more fixing points and a resonance frequency can be set higher. Reliability against vibrations can be thus enhanced.

Sixth Embodiment

Figure 8:
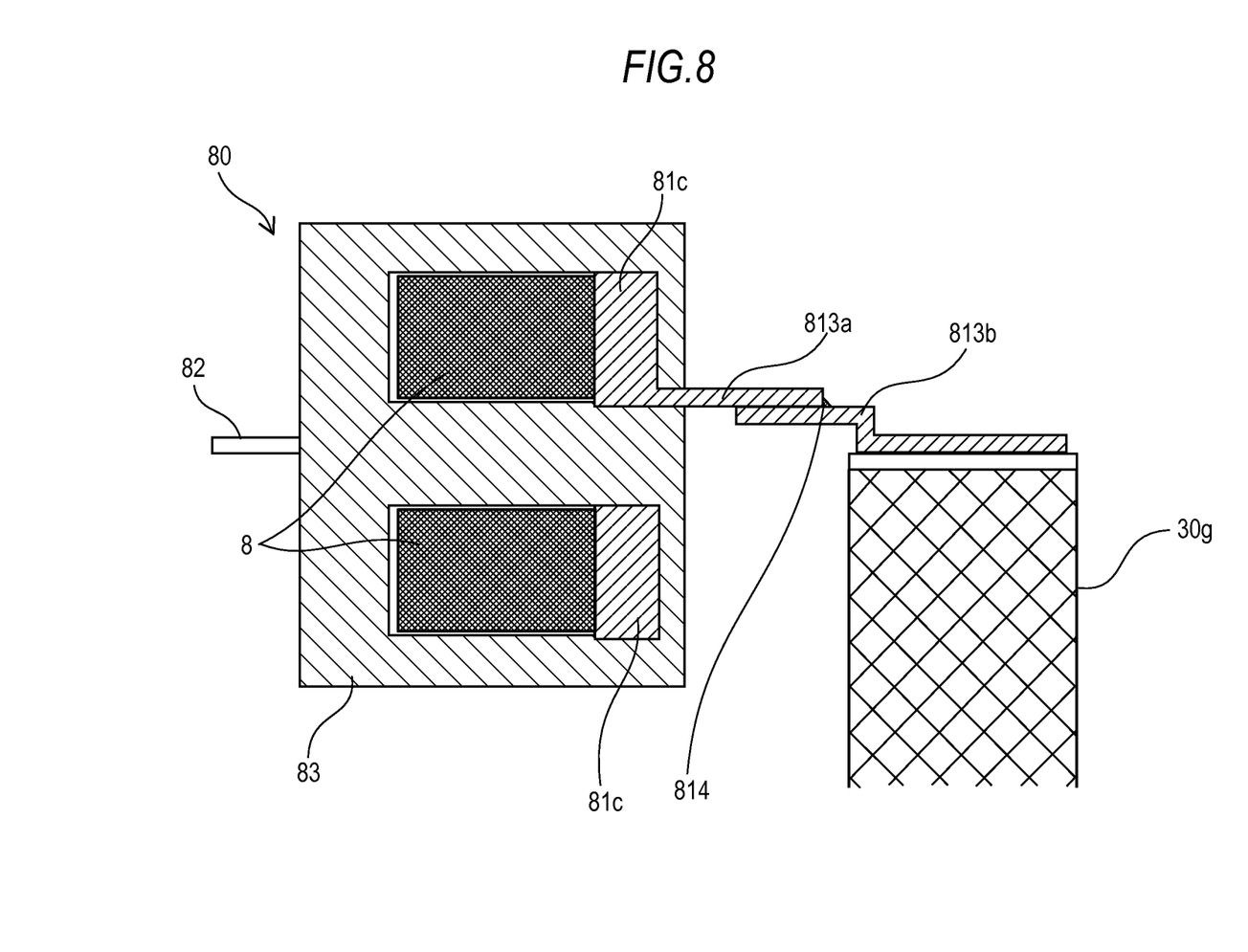
FIG. 8 is a cross section showing a brush holder in a rotating electrical machine of a sixth embodiment.

FIG. 8 is a cross section showing a brush holder in a rotating electrical machine according to a sixth embodiment of the invention. A brush temperature suppressing metal member 81c may be formed of at least two parts: a first brush temperature suppressing metal member plate-like portion 813a that is integrally molded with the brush holder forming resin 83 and a second brush temperature suppressing metal member plate-like portion 813b connected to a heat sink 30g. By forming the brush temperature suppressing metal member plate-like portion from at least two parts joined together, a shape of the first brush temperature suppressing metal member plate-like portion 813a can be as simple as possible. As a result, the manufacturing costs of the first brush temperature suppressing metal member plate-like portion can be saved and dimensional accuracy can be enhanced. Moreover, resistance properties of the brush holder itself against temperature cycles can be enhanced. Also, not only can a mold die be simpler, but also deterioration caused by wearing of the die itself can be suppressed during the molding of the brush holder. Hence, there is a cost advantage. In addition, a joined portion 814 is provided to a point on the outside of the brush holder where cooling air is flowing. Hence, a radiation area is increased. Also, a shape of the first brush temperature suppressing metal member plate-like portion 813a and the second brush temperature suppressing metal member plate-like portion 813b in the vicinity of the joined portion can be set arbitrarily. Hence, the plate-like portions can be installed at positions at which a flow of cooling air generated by the fans provided to the rotor 10 is not blocked.

REFERENCE SIGNS LIST

1: rotation shaft, 2: field core
3: field winding, 4: slip ring
5: stator, 6 and 7: brackets
8: brush, 9: slip ring terminal
10: rotor, 11: lead wire wound portion
12 and 13: cooling fans, 14: slip ring mold portion
15: spring, 16: rotation sensor
18: coil lead wire, 19: bearing
20: pulley, 30: power circuit portion
30a and 30b: power elements, 30g: heat sink
31: field circuit portion, 32: control circuit portion
32a: control circuit board, 33a: waterproof cover
35: outside connection connector, 40: exposed portion
50: mold resin, 60: molded article
80: brush holder, 80a: brush holder rectangular tube portion
80b: brush holder annular portion
81, 81a, 81b, and 81c: brush temperature suppressing metal members
82: energization terminal, 83: brush holder forming resin
84: high radiation clearance filling material, 85: insulating layer
86: sealing layer, 100: rotating electrical machine
300: power assembly, 811: projections and depressions
812: fin, 813, 813a and 813b: plate-like portions
814: joined portion

The invention claimed is:

1. A rotating electrical machine, comprising:
a rotation shaft supported in a rotatable manner on a housing having a front bracket and a rear bracket;
a stator fixed to the housing and having an armature winding;
a rotor fixed to the rotation shaft and having a field core and a field winding;
slip rings fixed to the rotation shaft and supplying a field current to the field winding;
a positive brush and a negative brush supplying the field current to the field winding via the slip rings; and
a brush holder holding the positive brush and the negative brush in storage portions of the brush holder in a movable manner and in a mutually electrically isolated state and having terminals supplying the field current to the positive brush and the negative brush,
wherein the positive brush and the negative brush selectively protrude from an end surface of the brush holder so as to come into contact with the slip rings,
wherein the brush holder includes a plurality of brush temperature suppressing metal members installed in the brush storage portions of the brush holder, wherein the plurality of brush temperature suppressing metal members come into contact with the positive brush and the negative brush; wherein at least one brush temperature suppressing metal member of the plurality of brush temperature suppressing metal members protrudes from a side surface of the brush holder adjacent to the end surface.

2. The rotating electrical machine according to claim 1, wherein:
the plurality of brush temperature suppressing metal members are insert-molded in the brush holder.

3. The rotating electrical machine according to claim 1, wherein:
the plurality of brush temperature suppressing metal members come into contact with two or more surfaces of the positive brush and the negative brush.

4. The rotating electrical machine according to claim 1, wherein:
the plurality of brush temperature suppressing metal members come into contact with surfaces of the positive brush and the negative brush on a side in a rotation direction of the rotor.

5. The rotating electrical machine according to claim 1, wherein:
the plurality of brush temperature suppressing metal members come into contact with only one of the positive brush and the negative brush.

6. The rotating electrical machine according to claim 1, wherein:
a portion of the at least one brush temperature suppressing metal member is exposed to an outside of the brush holder.

7. The rotating electrical machine according to claim 6, wherein:
the exposed portion of the at least one brush temperature suppressing metal member is covered with an insulating layer on a surface of the exposed portion.

8. The rotating electrical machine according to claim 1, wherein:
the plurality of brush temperature suppressing metal members are entirely covered with an insulating layer.

9. The rotating electrical machine according to claim 1, wherein:
an interface between a protruding portion of the at least one brush temperature suppressing metal member and the brush holder is sealed.

10. The rotating electrical machine according to claim 1, wherein:
the plurality of brush temperature suppressing metal members have a concavo-convex shape on a surface.

11. The rotating electrical machine according to claim 1, wherein:
a protruding portion of the at least one brush temperature suppressing metal member is provided with cooling fins.

12. The rotating electrical machine according to claim 1, wherein:
a protruding portion of the at least one brush temperature suppressing metal member is connected to a heat sink via an insulating member.

13. The rotating electrical machine according to claim 12, wherein:
the at least one brush temperature suppressing metal member is formed by connecting two or more component parts.

14. The rotating electrical machine according to claim 1, wherein
the at least one brush temperature suppressing metal member includes a plurality of projections and depressions formed on a side surface of the at least one brush temperature suppressing metal member where the positive brush and negative brush come into contact with the slip rings and an opposite side surface.

* * * * *